US008709625B2

(12) United States Patent
Choi et al.

(10) Patent No.: US 8,709,625 B2
(45) Date of Patent: Apr. 29, 2014

(54) CYLINDRICAL LITHIUM SECONDARY BATTERY COMPRISING A CONTOURED CENTER PIN

(75) Inventors: Woo-Hyuk Choi, Yongin-si (KR); Kwan-Sic Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 426 days.

(21) Appl. No.: 12/854,787

(22) Filed: Aug. 11, 2010

(65) Prior Publication Data

US 2011/0117397 A1   May 19, 2011

(30) Foreign Application Priority Data

Nov. 17, 2009   (KR) ......................... 10-2009-0110917

(51) Int. Cl.
*H01M 2/02* (2006.01)
*H01M 2/12* (2006.01)
*H01M 10/52* (2006.01)
*H01M 6/08* (2006.01)

(52) U.S. Cl.
USPC .............................. 429/56; 429/175; 429/164

(58) Field of Classification Search
USPC ............................. 429/94, 56, 164, 163, 175
See application file for complete search history.

(56) References Cited

U.S. PATENT DOCUMENTS

| 2003/0148175 A1 | 8/2003 | Iwanaga et al. |
| 2007/0269711 A1 | 11/2007 | Meguro et al. |
| 2009/0061304 A1 * | 3/2009 | Muraoka et al. ............... 429/163 |
| 2009/0208825 A1 * | 8/2009 | Lee ................................... 429/94 |
| 2009/0226799 A1 * | 9/2009 | Yamashita et al. .............. 429/56 |
| 2009/0233160 A1 * | 9/2009 | Kim ................................... 429/94 |

FOREIGN PATENT DOCUMENTS

| JP | 06196138 A * | 7/1994 | ............. H01M 2/12 |
| JP | 08273697 A * | 10/1996 | ............. H01M 10/04 |
| JP | 09-270251 | 10/1997 | |
| JP | 2003-229177 | 8/2003 | |
| KR | 10-2005-0113989 | 12/2005 | |
| KR | 2006-0027282 | 3/2006 | |
| KR | 10-2006-0104333 | 10/2006 | |
| KR | 10-2007-0084079 | 8/2007 | |
| KR | 10-2008-0066311 | 7/2008 | |
| WO | WO-2008/050981 A * | 5/2008 | ............. H01M 10/02 |

OTHER PUBLICATIONS

Machine Translation of: JP 06/196138A, Fujiwara et al., Jul. 15, 1994.*
Registration Certification dated Mar. 2, 2012 for corresponding KR Application No. 10-2009-0110917.
Korean Office Action dated Jul. 28, 2011 in Application No. 10-2009-0110917.

* cited by examiner

*Primary Examiner* — Kenneth Douyette
(74) *Attorney, Agent, or Firm* — Knobbe, Martens, Olson & Bear, LLP

(57) ABSTRACT

A cylindrical lithium secondary battery includes: an electrode assembly with a center pin at a center of the electrode assembly; a can accommodating the electrode assembly; and a cap assembly coupled to a top of the can, wherein at least one end of the center pin is contoured to deform during collision between the center pin and a bottom surface of the can or the cap assembly and to absorb the impact so as to prevent the center pin from escaping the cylindrical lithium secondary battery.

16 Claims, 8 Drawing Sheets

CYLINDRICAL LITHIUM SECONDARY BATTERY COMPRISING A CONTOURED CENTER PIN

RELATED APPLICATIONS

This application claims the benefit of Korean Patent Application No. 10-2009-0110917, filed on Nov. 17, 2009, in the Korean Intellectual Property Office, the disclosure of which is incorporated herein in its entirety by reference.

BACKGROUND

1. Field

One or more embodiments of the present invention relate to a cylindrical lithium secondary battery, and more particularly, to a cylindrical lithium secondary battery including a center pin.

2. Description of the Related Technology

In general, cylindrical lithium secondary batteries include a cylindrical electrode assembly combined with a center pin, a cylindrical can containing the electrode assembly, an electrolyte that is injected into the can to allow lithium ions to move, and a cap assembly connected to one side of the can to prevent the electrolyte from leaking out and the electrode assembly from being displaced. Such cylindrical lithium secondary batteries typically have a capacity ranging from about 2000 to about 4000 mA, and thus, are used in mobile devices with large power consumption such as notebook computers, digital cameras, and camcorders. For example, a plurality of cylindrical lithium secondary batteries are typically connected to each other in series or in parallel and assembled with a protective circuit to form a hard pack having a predetermined shape to be used as a power source for mobile devices. In addition, cylindrical lithium secondary batteries may be manufactured according to the following process. A negative electrode plate coated with a negative electrode active material, a separator, and a positive electrode plate coated with a positive electrode active material are stacked, where one end of the stack is bound to a rod-shaped winding axis, and the stack is wound to have a cylindrical shape. Then, a center pin is assembled with the electrode assembly, and the electrode assembly is inserted into the cylindrical can. Then, an electrolyte is injected into the cylindrical can, and a cap assembly is coupled to the upper portion of the cylindrical can to manufacture the cylindrical lithium secondary battery. Meanwhile, such cylindrical lithium secondary batteries include a safety vent that is deformed when the internal pressure increases due to an overcharge, and a circuit board that breaks according to the deformation of the safety vent to interrupt current in order to prevent explosion or outbreak of fire caused by the overcharge. In general, the safety vent and the circuit board constitute a current interrupt device (CID), which is an element of a cap assembly.

SUMMARY

One or more embodiments of the present invention include a cylindrical lithium second battery having excellent safety by preventing a center pin from protruding when the cylindrical lithium secondary battery internally explodes due to an increase in internal pressure.

Additional aspects will be set forth in part in the description which follows and, in part, will be apparent from the description, or may be learned by practice of the presented embodiments.

According to one or more embodiments of the present invention, a cylindrical lithium secondary battery includes an electrode assembly with a center pin at a center of the electrode assembly; a can accommodating the electrode assembly; and a cap assembly coupled to a top of the can, wherein at least one end of the center pin is contoured to deform during a collision between the center pin and a bottom surface of the can or the cap assembly and to absorb the impact so as to prevent the center pin from escaping the cylindrical lithium secondary battery.

The center pin may be hollow.

The at least one end of the center pin may have at least one notch formed on an outer surface of the center pin so as to be bent when pressure is applied to the at least one end of the center pin.

The notch may have a cross-section of at least one shape selected from the group consisting of a polygon, a circle, a saw-tooth, and a wave shape.

The at least one end of the center pin may be inclined in one direction.

Both ends of the center pin may be inclined in the same direction so that side surfaces of the both ends of the center pin are parallel to each other.

The at least one end of the center pin may be inclined in one direction, and the at least one end of the center pin may be inclined in a direction opposite the surface of the notch.

The at least one end of the center pin may have at least one notch formed to extend along an outer surface of the at least one end of the center pin so as to be bent when pressure is applied to the at least one end of the center pin.

The cap assembly may include a safety vent positioned over a top of the center pin and a circuit board positioned on the safety vent.

The cap assembly may include: a subdisk positioned over a top of the center pin; a vent welded to the subdisk; a cap down supporting the subdisk and the vent; and an insulator positioned between the cap down and the vent to insulate the cap down and the vent.

According to one or more embodiments of the present invention, a cylindrical lithium secondary battery includes a cylindrical center pin having at least one notch formed in an outer surface of at least one end of the center pin; an electrode assembly with the center pin at a center of the electrode assembly; a can accommodating the electrode assembly; and a cap assembly coupled to a top of the can, wherein the notch allows the at least one end of the center pin to be bent during collision between the center pin and a bottom surface of the can or the cap assembly and absorb the impact so as to prevent the center pin from escaping the cylindrical lithium secondary battery.

The notch may have a cross-section of at least one shape selected from the group consisting of a polygon, a circle, a saw-tooth, and a wave shape.

The at least one end of the center pin may be inclined in one direction.

Both ends of the center pin may be inclined in the same direction so that side surfaces of the both ends of the center pin are parallel to each other.

The at least one end of the center pin may be inclined in one direction, and the at least one end of the center pin may be inclined in a direction opposite the surface of the notch.

According to one or more embodiments of the present invention, a cylindrical lithium secondary battery includes: a cylindrical center pin having at least one notch formed to extend along an outer circumference surface of at least one end of the center pin; an electrode assembly with the center pin at a center of the electrode assembly; a can accommodating the electrode assembly; and a cap assembly coupled to a top a of the can, wherein the notch allows the at least one end of the center pin to be bent during collision between the center pin and a bottom surface of the can or the cap assembly and absorb the impact so as to prevent the center pin from escaping the cylindrical lithium secondary battery.

The at least one end of the center pin may be inclined in one direction.

Both ends of the center pin may be inclined in the same direction so that side surfaces of the both ends of the center pin are parallel to each other.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
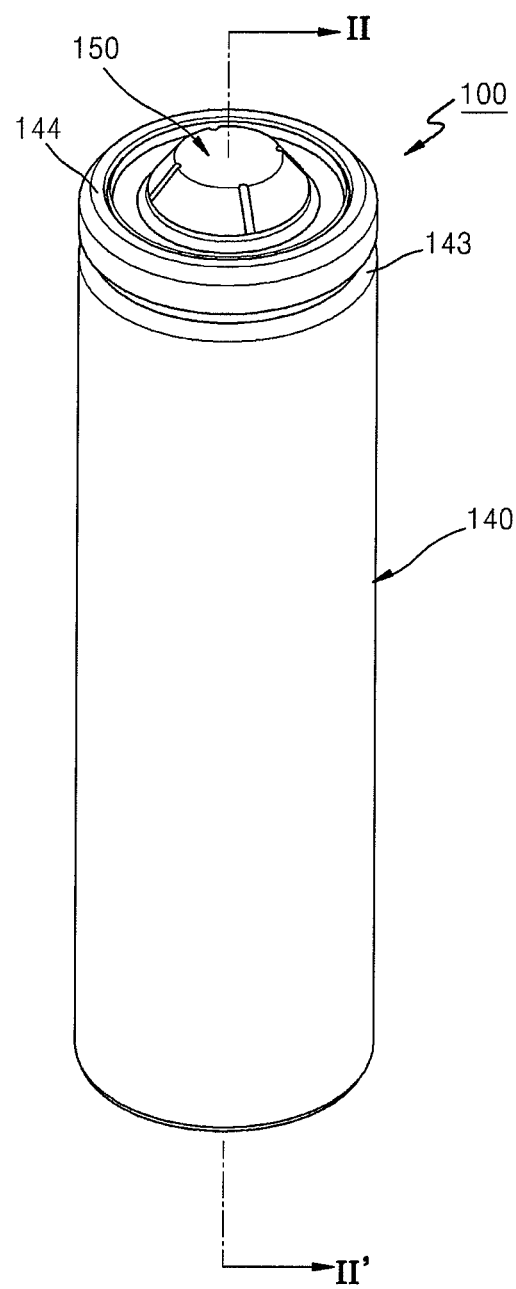
FIG. 1 is a schematic perspective view of a cylindrical lithium secondary battery according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 2:
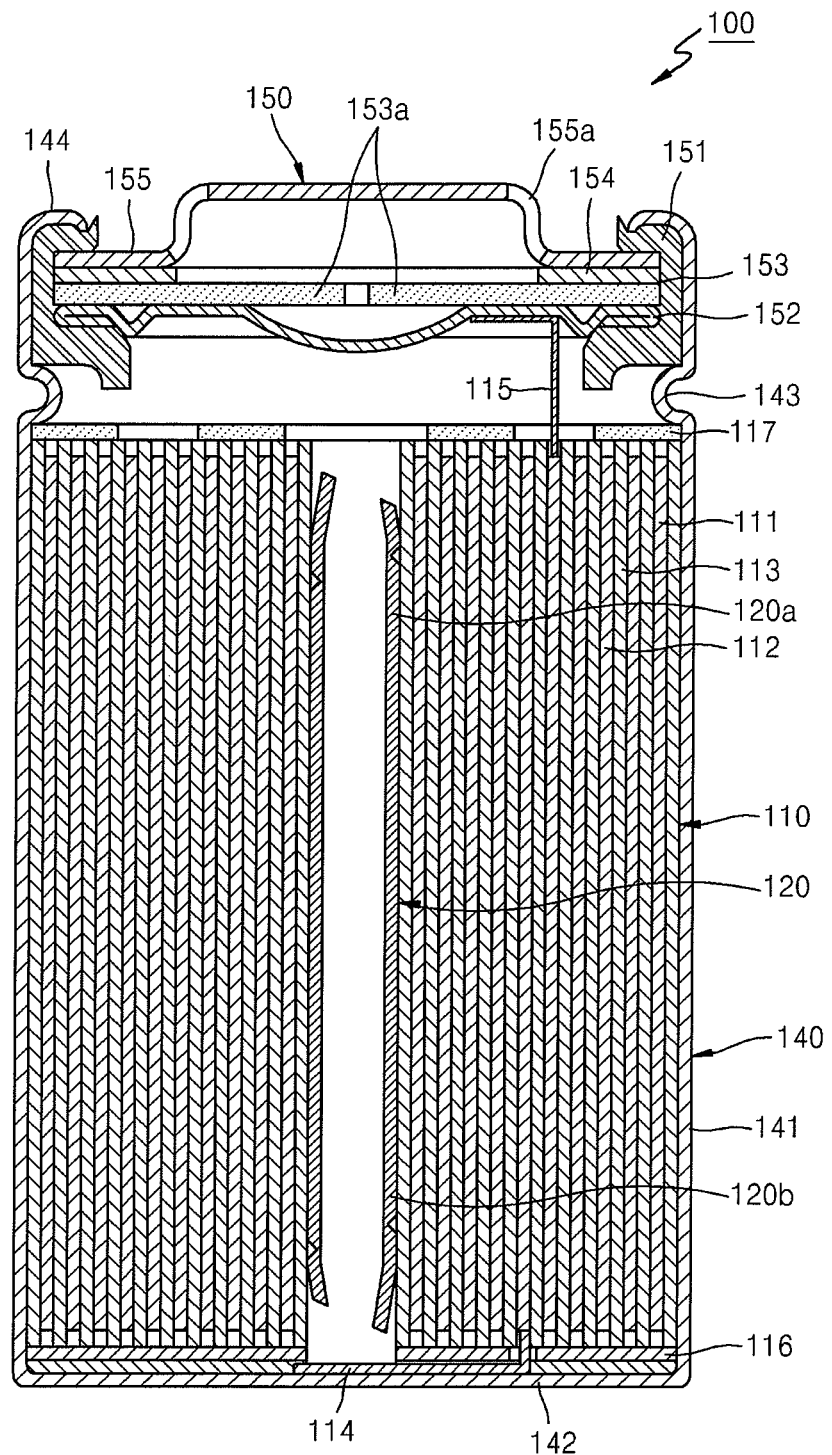
FIG. 2 is a schematic cross-sectional view taken along line II-II' of FIG. 1, according to an embodiment of the present invention.
Figure 3:
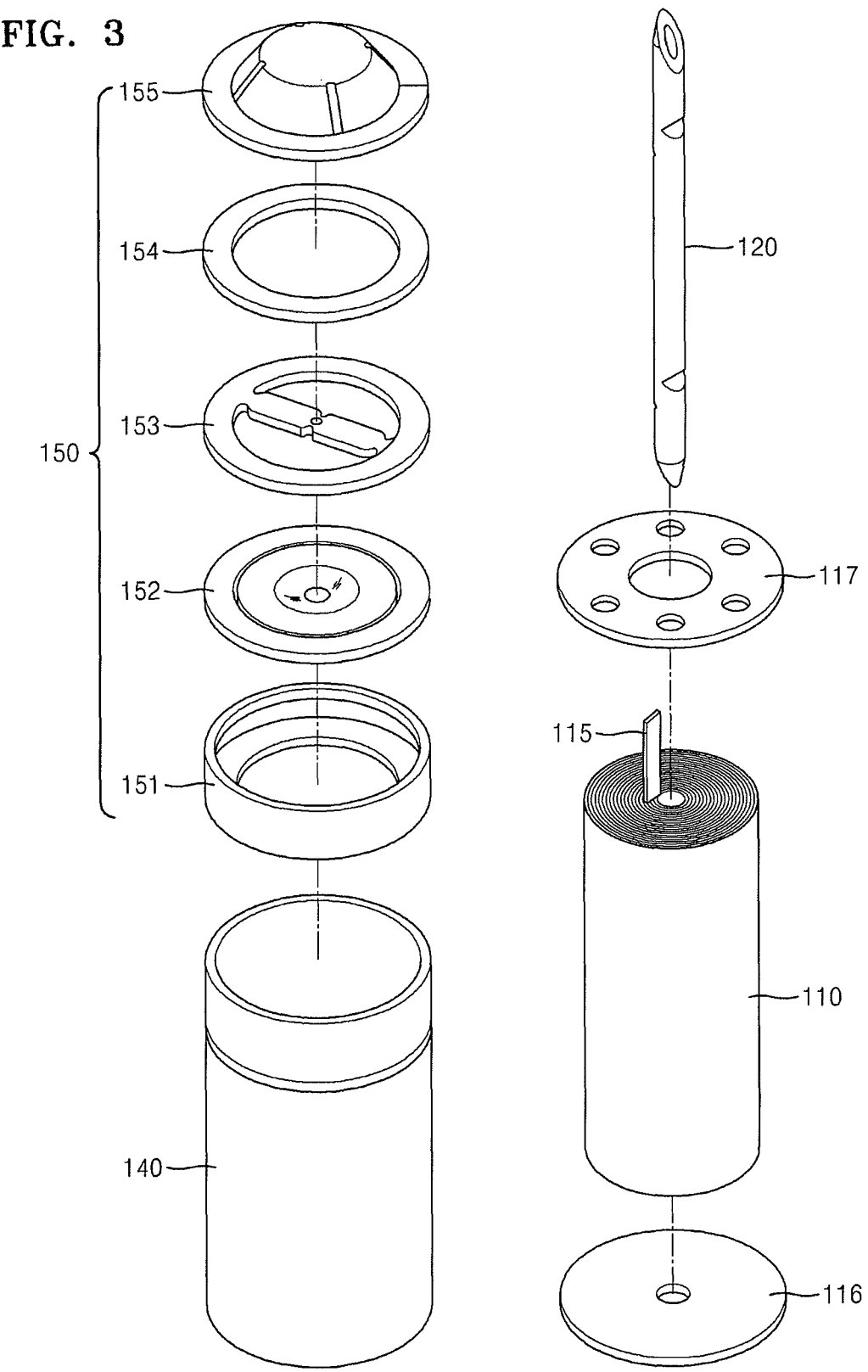
FIG. 3 is a schematic exploded perspective view of the cylindrical lithium secondary battery of FIG. 1, according to an embodiment of the present invention.

A cylindrical lithium secondary battery will now be described with reference to FIGS. 1 through 3. FIG. 1 is a schematic perspective view of a cylindrical lithium secondary battery 100 according to an embodiment of the present invention. FIG. 2 is a schematic cross-sectional view taken along line II-IF of FIG. 1, according to an embodiment of the present invention. FIG. 3 is a schematic exploded perspective view of the cylindrical lithium secondary battery of FIG. 1, according to an embodiment of the present invention.

As illustrated in FIGS. 1 through 3, the cylindrical lithium secondary battery 100 may include an electrode assembly 110, a center pin 120, a cylindrical can 140, and a cap assembly 150. The electrode assembly 110 may include a negative electrode plate 111, a positive electrode plate 112, and a separator 113. The negative electrode plate 111 may be coated with a negative active material, such as graphite. The positive electrode plate 112 may be coated with a positive active material, such as lithium cobalt acid ($LiCoO_2$). The separator 113 may be positioned between the negative electrode plate 111 and the positive electrode plate 112, prevent a short circuit therebetween, and allow only movement of lithium ions. The negative electrode plate 111, the positive electrode plate 112, and the separator 113 may be wound into an approximately cylindrical shape and inserted into the cylindrical can 140. The negative electrode plate 111 may be a copper (Cu) foil, the positive electrode plate 112 may be an aluminum (Al) foil, and the separator 113 may be formed of polyethylene (PE) or polypropylene (PP). In addition, the negative electrode plate 111 may include a negative electrode tab 114 welded thereto and protruding a predetermined length downwards and the positive electrode plate 112 may include a positive electrode tab 115 welded thereto and protruding a predetermined length upwards, or vice versa. The negative electrode tab 114 may be formed of nickel (Ni) and the positive electrode tab 115 may be formed of aluminum (Al). The center pin 120 may be coupled approximately to a center of the electrode assembly 110 and prevent the electrode assembly 110 from deforming during charging or discharging of the cylindrical lithium secondary battery 100. In this regard, the negative electrode plate 111, the positive electrode plate 112, the separator 113, the negative electrode tab 114, and the positive electrode tab 115 are not limited to the materials described in the above examples and the materials may easily be changed by one of ordinary skill in the art.

The cylindrical can 140 may be formed of steel, stainless steel, aluminium, or equivalents thereof, but the cylindrical can 140 is not limited thereto.

Referring to FIG. 3, the cap assembly 150 may include an insulating gasket 151, a safety vent 152, a circuit board 153, a positive temperature coefficient (PTC) 154, and a positive electrode cap 155. The cap assembly 150 may be disposed at one side of the cylindrical can 140. The gasket 151, which is generally ring-shaped, is coupled to a side of the cylindrical can 140. The safety vent 152 connected to the positive electrode tab 115 may be coupled to the insulating gasket 151. The safety vent 152 can deform or fracture when an internal pressure of the cylindrical can 140 rises and fractures the circuit board 153, or allows gas to escape to an exterior. The circuit board 153 may be positioned on top of the safety vent 152 and may be fractured or broken when the safety vent 152 deforms, thereby interrupting the flow of current. The PTC device 154 may be positioned on top of the circuit board 153 and interrupt the flow of current in cases of excessive current. The positive electrode cap 155 may be positioned on top of the PTC device 154 to provide positive electrode voltage (or negative electrode voltage) to the exterior. In addition, the positive electrode cap 155 may include a plurality of through-holes 155a for easy gas evacuation. The safety vent 152, the circuit board 153, the PTC device 154, and the positive electrode cap 155 may be positioned inside the insulating gasket 151 to prevent the components from being short-circuited directly from the cylindrical can 140. The circuit board 153 may have a wiring pattern 153a formed on the surface thereof which is naturally cut off when the circuit board 153 is fractured or broken.

Figure 4:
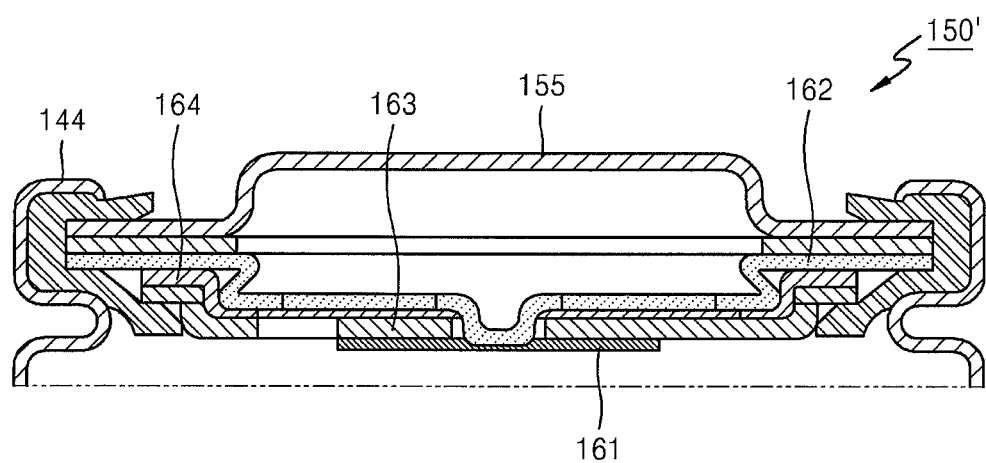
FIG. 4 is a cross-sectional view of a cap assembly, according to an embodiment of the present invention.

The cap assembly 150 is not limited thereto. For example, the cap assembly 150 may not include the PTC device 154. FIG. 4 is a cross-sectional view of a cap assembly 150', according to an embodiment of the present invention. Referring to FIG. 4, the cap assembly 150' can include a subdisk 161, a vent 162, a cap down 163, and an insulator 164. The subdisk 161 may be disposed to correspond to an end 120a of the center pin 120. The vent 162 may be welded to the subdisk 161. When the vent 162 can deform due to increasing gas pressure, the subdisk 161 and the vent 162 may be separated from each other to interrupt flow of current. The cap down 163 can maintain the structure of the subdisk 161 and the vent 162. The insulator 164 may be placed between the cap down 163 and the vent 162 to be insulated.

The cap assembly 150 will be described mainly with reference to FIGS. 1 through 3, but is not limited thereto. The function and operation of the center pin 120 of the cap assembly 150 illustrated in FIG. 2 are the same as those of the center pin 120 of the cap assembly 150' illustrated in FIG. 4.

Referring to FIG. 2, the cylindrical can 140 may include a beading part 143 positioned on a lower portion of the cap assembly 150 which is recessed towards an interior of the battery, and a crimping part 144 formed on an upper portion of the cap assembly 150 which is bent towards an interior of the battery. The beading part 143 and the crimping part 144 may firmly support the cap assembly 150 fixedly on the cylindrical can 140 to prevent the cap assembly 150 from escaping to the exterior and also prevent an electrolyte from leaking out. The cylindrical can 140 may have the electrolyte injected therein to enable movement of lithium ions, the ions being created by electrochemical reaction from the negative electrode and positive electrode plates 111 and 112 within cylindrical lithium secondary battery 100 during charging/discharging. The electrolyte may be a non-aqueous organic electrolyte, such as a mixture of lithium salt and high-purity organic solvent. In addition, the electrolyte may instead be a polymer using a high-molecular electrolyte, but the type of the electrolyte is not limited thereto.

The center pin 120 may be coupled to the center of the electrode assembly 110. The center pin 120 has a long hollow cylindrical shape with a hole, but the structure thereof is not limited thereto. For example, the center pin 120 may not be hollow, and may instead be filled. A secondary battery may internally explode due to various problems, such as sudden heating. For example, when the cylindrical lithium secondary battery 100 is overcharged, the electrolyte in approximately an upper portion of the electrode assembly 110 can evaporate, which increases an electric resistance thereof. As a result, the electrode assembly 110 can deforms from a center region thereof, causing lithium precipitation. In addition, as the electric resistance in the upper portion of the electrode assembly 110 increases, heat is locally generated in the cylindrical lithium secondary battery 100, and thus the temperature of the cylindrical lithium secondary battery 100 may rapidly increase. In this state, an internal pressure of the cylindrical lithium secondary battery 100 may rapidly increase by generation of gas due to decomposition of cyclo hexyl benzene (CHB) and biphenyl (BP), which generally occurs during overcharging, thereby increasing the possibility of an internal explosion. If the cylindrical lithium secondary battery 100 internally explodes, the center pin 120 may protrude out of the cylindrical lithium secondary battery 100, causing safety problems. In the present embodiment of the present invention, at least one end of the center pin 120 may deform when collided with an inner surface of the cylindrical can 140 or the cap assembly 150, and thus the center pin 120 may absorb the impact. As a result, the center pin 120 may not protrude out of the battery.

Hereinafter, a principle of preventing the center pin 120 from escaping from the cylindrical lithium secondary battery 100 including the center pin 120 when collided with the cap assembly 150 will be described.

Figure 5A:
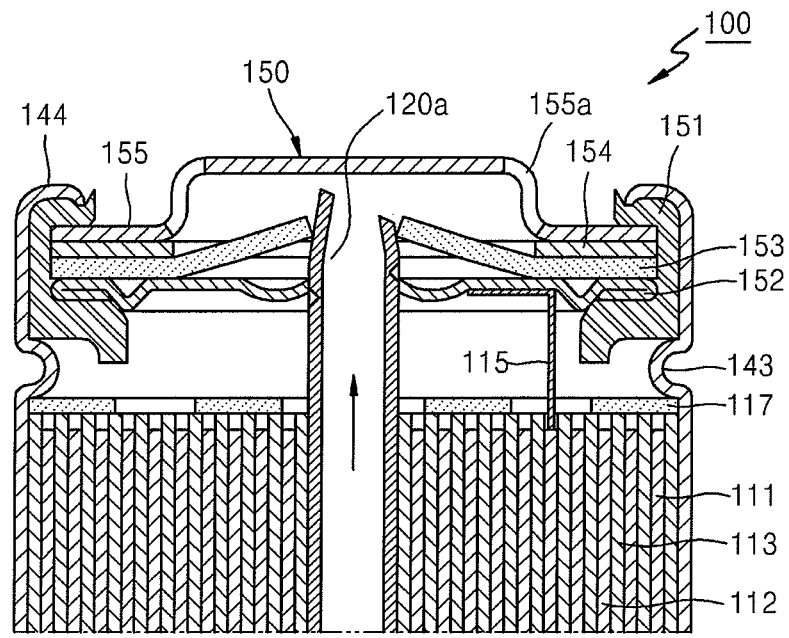
FIGS. 5A and 5B are partial cross-sectional views of a cylindrical lithium secondary battery according to an embodiment of the present invention illustrating a center pin that is deformed by the collision with a positive electrode cap due to the internal explosion of the lithium secondary battery.
Figure 5B:
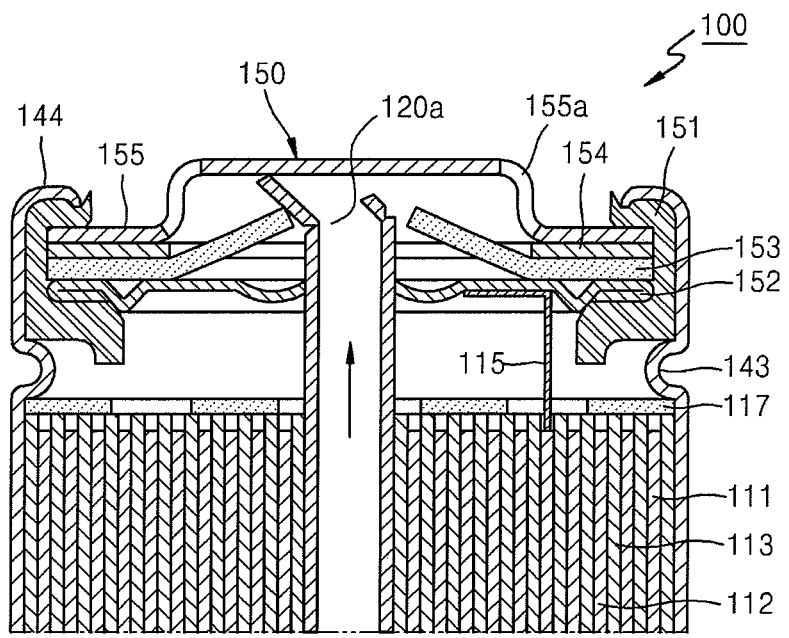

Referring to FIG. 5A, when the internal pressure of the cylindrical lithium secondary battery 100 rapidly increases, the center pin 120 may first collide with the safety vent 152. The center pin 120 may penetrate the safety vent 152, deforming the safety vent 152. With the safety vent 152 fractured, the circuit board 153 positioned on the safety vent 152 may be fractured and interrupt the flow of current. Thus, the wiring pattern formed on the circuit board 153 may be cut off to interrupt the current flow, thereby functioning as a safety device. In particular, when the safety vent 152 is deformed by the collision of an end 120a of the center pin 120 with the safety vent 152, the mechanical force of the center pin 120 in addition to the increased internal pressure directly apply to the safety vent 152. As a result, the safety vent 152 and the circuit board 153 may be more completely deformed and act as better safety devices. Subsequently, the center pin 120 collides with the positive electrode cap 155. In this regard, the end 120a of the center pin 120 may be configured to easily deform, and thus, when the center pin 120 may collide with the positive electrode cap 155, the end 120a of the center pin 120 may deform as illustrated in FIG. 5B and absorb the impact so as to prevent the center pin 120 from escaping the cylindrical lithium secondary battery 100.

Hereinafter, for convenience of understanding, only the collision between the center pin 120 and the positive electrode cap 155 will be described. However, collisions are not limited thereto. For example, the center pin 120 may collide with a bottom surface 142 of the cylindrical can 140.

At least one end of the center pin 120 may deform during the collision, and the end 120a of the center pin 120 may be configured variously. For example, the end 120a of the center pin 120 may have a notched end n. The notched end n may be a notch formed on an outer surface of the center pin 120, the notch being a predetermined distance apart from the end 120a of the center pin 120, as illustrated in FIGS. 6A through 6E and 7A through 7E, or may be a notch formed to extend along the outer surface of the center pin 120, as illustrated in FIGS. 8A through 8E.

A detailed description of the center pin 120 having the notched end n will now be described with reference to FIGS. 6A through 8E. In each embodiment, the description of the center pin 120 is provided based on the shape penetrated in a longitudinal direction, but the shape of the center pin 120 is not limited thereto. For example, the center pin 120 may be hollow, or may be filled.

FIGS. 6A through 6E are schematic side cross-sectional views of ends of center pins, according to embodiments of the present invention. FIGS. 7A through 7E are schematic perspective views of the center pins illustrated in FIGS. 6A through 6E, according to embodiments of the present invention. FIGS. 8A through 8E are schematic perspective views of end of center pins, according to embodiments of the present invention.

Figure 6A:
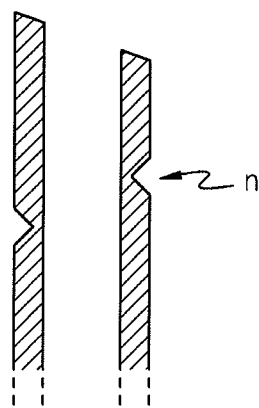
FIGS. 6A through 6E are schematic side cross-sectional views of ends of center pins, according to embodiments of the present invention.
Figure 6B:
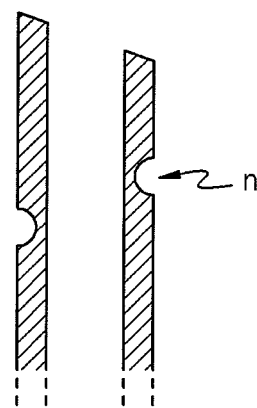
Figure 6C:
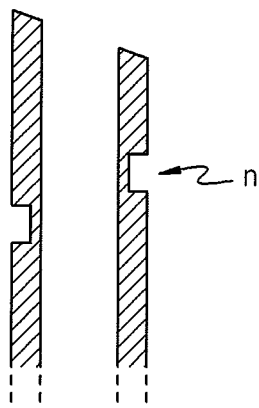
Figure 6D:
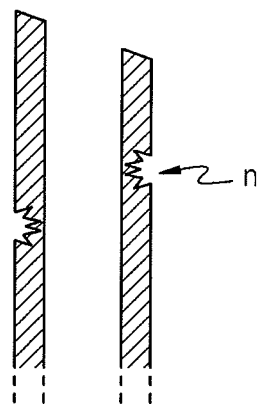
Figure 6E:
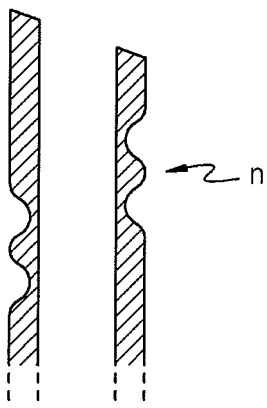
Figure 7A:
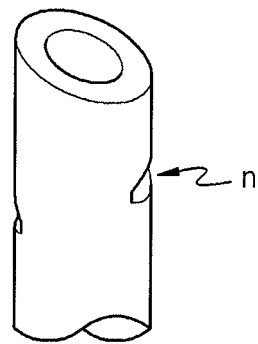
FIGS. 7A through 7E are schematic perspective views of the center pins of FIGS. 6A through 6E, according to embodiments of the present invention.
Figure 7B:
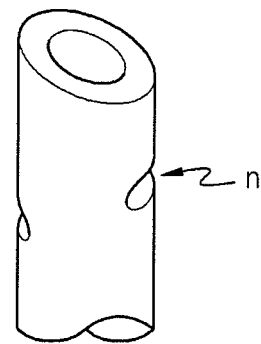
Figure 7C:
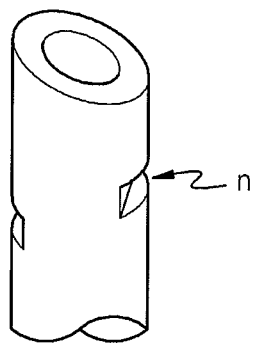
Figure 7D:
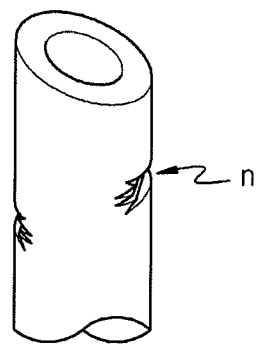
Figure 7E:
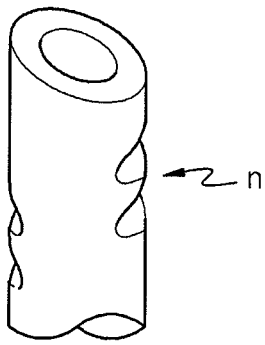

Referring to FIGS. 6A and 7A, the notched end n is formed on the outer surface of the center pin 120, at a predetermined distance apart from the end 120a of the center pin 120, and has a triangular cross-section. However, the shape of the notched end n is not limited thereto. In other words, the notched end n may have a circular cross-section as illustrated in FIGS. 6B and 7B, a rectangular cross-section as illustrated in FIGS. 6C and 7C, a saw-tooth cross-section as illustrated in FIGS. 6D and 7D, or a wave-shaped cross-section as illustrated in FIGS. 6E and 7E.

The end 120a of the center pin 120 may have a slope that easily slides radially inward when the end collides with the positive electrode cap 155. Referring to FIG. 5A, the end 120a of the center pin 120 slants downward toward the right.

Thus, when the end 120a of the center pin 120 collides with the positive electrode cap 155, the inclined surface of the end 120a is guided by a bottom surface of the positive electrode cap 155. As a result, the end 120a of the center pin 120 can easily deform to the left. However, the shape of the end 120a of the center pin 120 is not limited thereto, and may not be inclined. The size of an opening of the center pin 120 can be increased due to the inclination, and therefore, gas going up from the bottom of the cylindrical lithium secondary battery 100 can be easily exhausted through the hole of the center pin 120.

In addition, with respect to cross-sections showing the notched end n, if the notched end n on the right side of the center pin 120 is formed on the notched end n on the left side of the center pin 120, then the end 120a of the center pin 120 is easily deformed to the left.

When the end 120a of the center pin 120 is inclined so as to easily slide radially outward during the collision between the center pin 120 and the positive electrode cap 155, with respect to cross-sections showing the notched end n, the notched end n on the left side of the center pin 120 may be formed on the notched end n on the right side of the center pin 120. Thus, the end 120a of the center pin 120 can be easily deformed to the right.

Figure 8A:
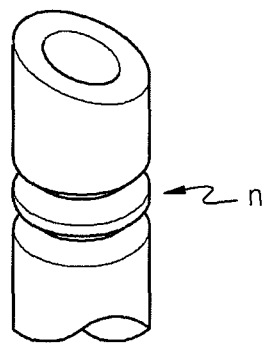
FIGS. 8A through 8E are schematic perspective views of ends of center pins, according to embodiments of the present invention.
Figure 8B:
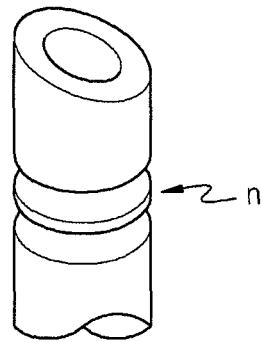
Figure 8C:
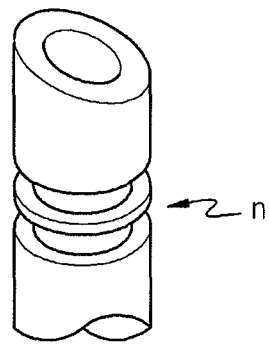
Figure 8D:
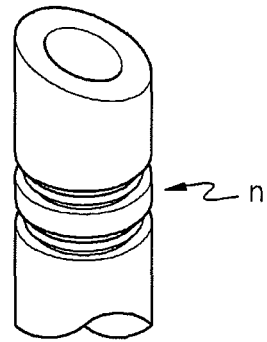
Figure 8E:
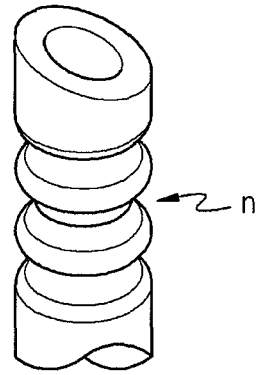

Referring to FIG. 8A, the end 120a of the center pin 120 has the notched end n formed to extend along the outer circumference surface of the center pin 120 and having a triangular cross-section. However, the shape of the notched end n is not limited thereto, and the notched end n may have a circular cross-section as illustrated in FIG. 8B, a tetragonal cross-section as illustrated in FIG. 8C, a saw-tooth cross-section as illustrated in FIG. 8D, or a wave-shaped cross-section as illustrated in FIG. 8E.

The end 120a of the center pin 120 may have a slope that easily slides radially inward when the end collides with the positive electrode cap 155. Referring to FIG. 5A, the end 120a of the center pin 120 slants downward toward the right. Thus, when the end 120a of the center pin 120 collides with the positive electrode cap 155, the inclined surface of the end 120a may be guided by the bottom surface of the positive electrode cap 155. As a result, the end 120a of the center pin 120 can easily deform to the left. However, the shape of the end 120a of the center pin 120 is not limited thereto, and may not be inclined. The size of an opening of the center pin 120 may be increased due to the inclination, and thus the gas going up from the bottom of the battery may be easily exhausted to the top of the battery through the hole of the center pin 120.

As illustrated in the drawings, the end 120a of the center pin 120 has the notched end n, and thus, when the center pin 120 collides with the positive electrode cap 155 due to an internal explosion, the center pin 120 may easily be torn off or deformed. Thus, the center pin 120 may not penetrate into the positive electrode cap 155 and not protrude out of the battery.

As described above, according to the one or more of the above embodiments of the present invention, the center pin is fractured and deformed when colliding with the cap assembly and/or the inner surface of the can during the internal explosion of the cylindrical lithium secondary battery so as to prevent the center pin from protruding and to improve safety of the cylindrical lithium secondary battery.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A cylindrical lithium secondary battery comprising:
an electrode assembly with a center pin having a circumference that extends in a first axial direction and has a first end and a second end at a center of the electrode assembly;
a can accommodating the electrode assembly; and
a cap assembly coupled to a top of the can,
wherein at least one end of the center pin is contoured to deform during a collision between the center pin and a bottom surface of the can or the cap assembly and to absorb the impact so as to prevent the center pin from escaping the cylindrical lithium secondary battery wherein the at least one end is inclined so that the center pin is induced to deform in a first direction and has a plurality of notches that extend partially through the center pin about the circumference of the center pin adjacent the first end that are positioned so as to induce the center pin to deform in the first direction such that a portion of the center pin that extends from the notches towards cap assembly deforms in a direction away from the first axial direction,
wherein the at least one end of the center pin has at least one notch formed on an outer surface of the center pin so as to be bent when pressure is applied to the at least one end of the center pin.

2. The cylindrical lithium secondary battery of claim 1, wherein the center pin is hollow.

3. The cylindrical lithium secondary battery of claim 1, wherein the notch has a cross-section of at least one shape selected from the group consisting of a polygon, a circle, a saw-tooth, and a wave shape.

4. The cylindrical lithium secondary battery of claim 1, wherein both ends of the center pin are inclined in the same direction so that side surfaces of both ends of the center pin are parallel to each other.

5. The cylindrical lithium secondary battery of claim 1, wherein the at least one end of the center pin is inclined in one direction, and the at least one end of the center pin is inclined in a direction opposite the surface of the notch.

6. The cylindrical lithium secondary battery of claim 1, wherein the cap assembly comprises a safety vent positioned over a top of the center pin and a circuit board positioned on the safety vent.

7. The cylindrical lithium secondary battery of claim 1, wherein the cap assembly comprises: a subdisk positioned over a top of the center pin; a vent welded to the subdisk; a cap down supporting the subdisk and the vent; and an insulator positioned between the cap down and the vent to insulate the cap down and the vent.

8. A cylindrical lithium secondary battery comprising:
an electrode assembly with a center pin having a circumference that extends in a first axial direction and has a first end and a second end at a center of the electrode assembly;
a can accommodating the electrode assembly; and
a cap assembly coupled to a top of the can,
wherein at least one end of the center pin is contoured to deform during a collision between the center pin and a bottom surface of the can or the cap assembly and to absorb the impact so as to prevent the center pin from escaping the cylindrical lithium secondary battery wherein the at least one end is inclined so that the center pin is induced to deform in a first direction and has a plurality of notches that extend partially through the center pin about the circumference of the center pin adjacent the first end that are positioned so as to induce the center pin to deform in the first direction such that a portion of the center pin that extends from the notches towards cap assembly deforms in a direction away from the first axial direction, wherein the at least one end of the center pin has at least one notch formed to extend along an outer circumference surface of the at least one end of the center pin so as to be bent when pressure is applied to the at least one end of the center pin.

9. A cylindrical lithium secondary battery comprising:
a cylindrical center pin that extends in a first axial direction having an end and at least one notch formed on an outer surface of at least one end of the center pin wherein the notch extends partially into the center pin;
an electrode assembly with the center pin at a center of the electrode assembly;
a can accommodating the electrode assembly; and
a cap assembly coupled to a top of the can,
wherein the notch at one end of the center pin allows the at least one end of the center pin to be bent during collision between the center pin and a bottom surface of the can or the cap assembly in a first direction away from the first axial direction and absorb the impact so as to prevent the center pin from escaping the cylindrical lithium secondary battery and wherein the end of the center pin is contoured so as to induce the center pin to deform in the first direction such that a portion of the center pin that extends from the notch towards cap assembly deforms in a direction away from the first axial direction.

10. The cylindrical lithium secondary battery of claim 9, wherein the end with the notch has a cross-section of at least one shape selected from the group consisting of a polygon, a circle, a saw-tooth, and a wave shape.

11. The cylindrical lithium secondary battery of claim 9, wherein the at least one end of the center pin is inclined in one direction.

12. The cylindrical lithium secondary battery of claim 11, wherein both ends of the center pin are inclined in the same direction so that side surfaces of both ends of the center pin are parallel to each other.

13. The cylindrical lithium secondary battery of claim 9, wherein the at least one end of the center pin is inclined in one direction, and the at least one end of the center pin is inclined in a direction opposite the surface of the notch.

14. A cylindrical lithium secondary battery comprising:
a cylindrical center pin that extends in a first axial direction having an end and at least one notch formed to extend along an outer circumference surface of at least one end of the center pin wherein the notch extends partially through the outer circumference surface of the cylindrical center pin;
an electrode assembly with the center pin at a center thereof;
a can accommodating the electrode assembly; and
a cap assembly coupled to a top of the can,
wherein the notch allows the at least one end of the center pin to be bent during collision between the center pin and a bottom surface of the can or the cap assembly and absorb the impact so as to prevent the center pin from escaping the cylindrical lithium secondary battery direction and such that a portion of the center pin that extends from the notches towards cap assembly deforms in a direction away from the first axial direction.

15. The cylindrical lithium secondary battery of claim 14, wherein the at least one end of the center pin is inclined in one direction.

16. The cylindrical lithium secondary battery of claim 15, wherein both ends of the center pin are inclined in the same direction so that side surfaces of the both ends of the center pin are parallel to each other.

* * * * *